(12) United States Patent
Liu et al.

(10) Patent No.: US 11,075,026 B2
(45) Date of Patent: Jul. 27, 2021

(54) MAGNETIC CONDUCTIVE NIFE ALLOYS

(71) Applicant: ARIZONA BOARD OF REGENTS ON BEHALF OF ARIZONA STATE UNIVERSITY, Scottsdale, AZ (US)

(72) Inventors: Minglu Liu, Chandler, AZ (US); Karl Sieradzki, Scottsdale, AZ (US); Brandon Dowd, Cave Creek, AZ (US); Rodolfo E. Diaz, Phoenix, AZ (US)

(73) Assignee: ARIZONA BOARD OF REGENTS ON BEHALF OF ARIZONA STATE UNIVERSITY, Scottsdale, AZ (US)

(*) Notice: Subject to any disclaimer, the term of this patent is extended or adjusted under 35 U.S.C. 154(b) by 32 days.

(21) Appl. No.: 16/399,924

(22) Filed: Apr. 30, 2019

(65) Prior Publication Data

US 2019/0378638 A1 Dec. 12, 2019

Related U.S. Application Data

(60) Provisional application No. 62/682,056, filed on Jun. 7, 2018.

(51) Int. Cl.
 *H01F 1/147* (2006.01)
 *H01F 41/26* (2006.01)
 (Continued)

(52) U.S. Cl.
 CPC ......... *H01F 1/14716* (2013.01); *B32B 15/08* (2013.01); *C22C 19/03* (2013.01);
 (Continued)

(58) Field of Classification Search
 CPC ..... B32B 15/08; C22C 19/03; C22C 2202/02; C25D 3/12; C25D 3/562; C25D 7/001;
 (Continued)

(56) References Cited

U.S. PATENT DOCUMENTS

| 6,146,691 A | 11/2000 | Diaz et al. |
| 6,337,125 B1 | 1/2002 | Diaz et al. |
| 2006/0215315 A1* | 9/2006 | Miyake .................. G11B 5/3113 360/125.33 |

OTHER PUBLICATIONS

Palavesam et al., "Roll-to-Roll Processing of Film Substrates for Hybrid Integrated Flexible Electronics", DOI:10.1088/2058-8585/aaaa04 (Year: 2018).*

(Continued)

*Primary Examiner* — Laura C Powers
*Assistant Examiner* — Rebecca L Grusby
(74) *Attorney, Agent, or Firm* — Schwabe Williamson & Wyatt, P C.

(57) ABSTRACT

Embodiments herein describe techniques for a magnetic conductive device including a substrate, an under layer above the substrate, and a magnetic conductive layer including NiFe alloy formed on the under layer. A method for forming a magnetic conductive device includes forming a support stack including an under layer above a substrate, cleaning the support stack, and performing electrodeposition on the under layer by placing the support stack into a plating bath to form NiFe alloy on the under layer. The NiFe alloy includes Ni in a range of about 74% to about 84%, and Fe in a range of about 26% to about 16%. Other embodiments may be described and/or claimed.

19 Claims, 17 Drawing Sheets

(51) Int. Cl.
C25D 3/12 (2006.01)
B32B 15/08 (2006.01)
C22C 19/03 (2006.01)
B32B 7/025 (2019.01)

(52) U.S. Cl.
CPC .............. *C25D 3/12* (2013.01); *H01F 41/26* (2013.01); *B32B 7/025* (2019.01); *C22C 2202/02* (2013.01)

(58) Field of Classification Search
CPC ...... H01F 1/14716; H01F 10/14; H01F 41/26; H01F 10/00; H01F 10/08; H01F 10/10; H01F 10/12
See application file for complete search history.

(56) References Cited

OTHER PUBLICATIONS

Yousefi et al., "Pushing the Limits of Radiofrequency (RF) Neuronal Telemetry", DOI:10.1038/srep10588. (Year: 2015).*
O'Donnell, Terence. "Electrodeposited anisotropic NiFe 45/55 thin films for high-frequency micro-inductor applications". doi.org/10.1016/j.jmmm.2009.01.038 (Year: 2009).*
Auckland, et al., "A New Type of Conformal Antenna Using Magnetic Flux Channels," presented at the 2014 Military Communications Conference, Baltimore, MD, pp. 372-375, Oct. 2014.
Liu, X. et al., "High-frequency behavior of electrodeposited Fe—Co—Ni alloys", IEEE Transactions on Magnetics, Sep. 2003, vol. 39, No. 5, pp. 2362-2364 <DOI:10.1109/TMAG.2003.815450>.
Sebastian, et al., "Improved accuracy thin film permeability extraction for a microstrip permeameter", Journal of Applied Physics, vol. 113, No. 3, 8 pages, Jan. 21, 2013.
Zong, B. et al., "Electrodeposition of granular FeCoNi films with large permeability for microwave applications ", Journal of Materials Chemistry, Sep. 2011, vol. 21, No. 40, pp. 16042-16048 <DOI:10.1039/C1JM13398E>.
Brankovic, S.R., et al., "Surfactant Mediated Electrochemical Deposition of Ag on Au(111)", Eltrochemical and Solid-State Letters, 2 (9), pp. 443-445 (1999).
Chen, Qing, et al., "Spontaneous evolution of bicontinuous nanostructures in dealloyed Li-based systems", NatureMaterials, 12, 1102-1106 (2013) doi:10.1038/nmat3741, Aug. 25, 2013.
Friesen, C., et al., "Surface Stress and the Electrocapilarity of Solid Electrodes", Langmuir, 17, pp. 807-815 (2001).
Girard, R., "The Electrodeposition of Thin Magnetic Permalloy Films", Jounral of Applied Physics, vol. 38, No. 1., pp. 1423-1430 (1967).
Kim, et al., "Soft Magnetic Films by Electroless Ni—Co—P Plating", J. Electrochem. Soc., vol. 142, Nbo. 11, pp. 3763-3767 (1995).
Leith, Steven D., et al., "Characterization of NixFe1-x (0.10<x<0.95) Electrodeposition from a Family of Sufamate-Chloride Electrolytes", Journal of the Electrochemical Society, 146 4), pp. 1431-1435, (1999).
Murthy, S.K., et al., "Electroless Deposition of Soft Magnetic CoNiP Thin Films", J. Electrochem. Soc., 151 (1), pp. C1-C7 (2004).
Pierozynski, Boguslaw, "Electrodeposition of Nickel onto 12K Carbon Fibre Tow in a Continuous Manner"; Croatica Chemica Acta; vol. 85, No. 1, pp. 1-8, 2012.
Sebastian, Tom, "Magneto-Dielectric Wire Antennas Theory and Design", Arizona State University, PhD Dissertation, May 2013, 213 pages.
Sieradzki, K., et al., "Electrochemical Defect-Mediated Thin-Film Growth", Science, 284, pp. 138-141 (1999).
Smit, J., et al., "Static Initial Permeability", Philips Technical Library, 1959; §50.1, 24 pages.
Toray, "Torelina" Product Information from URL: http://www.toray.jp/films/en/products/torelina/index.html, 2017, 1 page.
Trimble, T., et al., "Anion Adsorption Induced Reversal of Coherency Strain", Physical Review Letters, PRL 95, 166106 (2005), 4 pages.
Vasiljevic, T. et al., "Electrocapillarity Behavior of Au(111) in SO42- and F-", Langmuir, 20, pp. 6639-6643 (2004).
Venkatesetty, H.V., "Electrodeposition of This Magnetic Permalloy Films", J. Electrochem. Soc., vol. 117, No. 3, Mar. 1970, pp. 403-407.
Wang, Lingling. et al., "Composition, structure and corrosion characteristics of Ni—Fe—P. and Ni—Fe—P—B alloy deposits prepared by electroless plating", Surface and Coatings Technology, 126, pp. 272-278 (2000).
Yokoshima, Tokihiko, et al., "Micropattern Formation for Magnetic Recording Head Using Electroless CoFeB Deposition", J. Electrochem. Soc., 149 (8), pp. C375-382 (2004).
Yousefi, Tara, et al., "Why the Magnetic Loss Tangent is Not a Relevant Constraint for Permeable Conformal Antennas", IEEE Transactions on Antennas and Propagation, vol. 64, No. 7, Jul. 2016, pp. 2784-2796.

* cited by examiner

Photo image of electrodeposited NiFe alloy thin film on 12 um polyethylene glycol substrates (20 nm Cu underlayer).

A NiFe alloy thin film with composition Ni74-84Fe26-16 Wt%

Scanning electron microscopy image of electrodeposited NiFe alloy thin film on 12 um polyethylene glycol substrates with 20 nm Cu underlayer. (The imperfection is included for contrast)

5 nm Cr, 30 nm Cu on 12 um PET

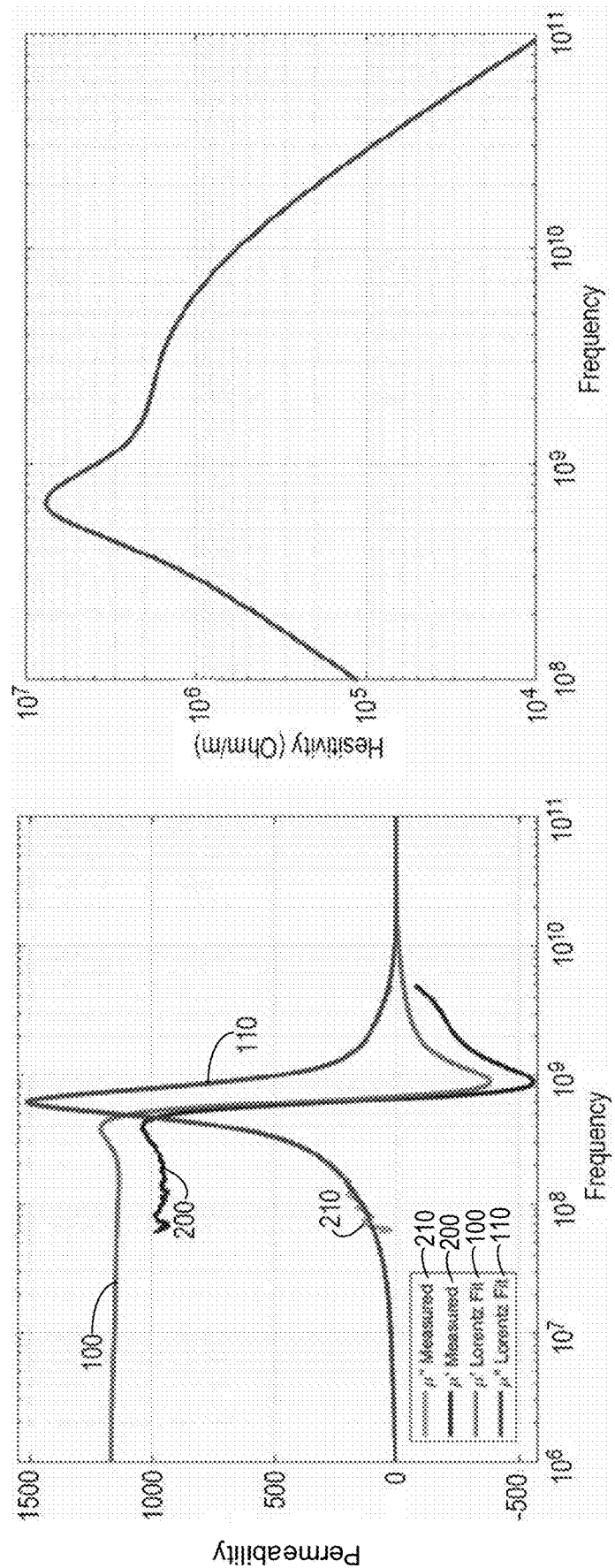
Figure 3. Magnetic permeability and conductivity results measured using a microstrip permeameter from an electrodeposited NiFe alloy thin film on glass substrate with 35 nm Cu under layer.

Polymer (flexible substrate) Sample No. 1

Polymer (flexible substrate) Sample No. 2

Sample No. 2 (glass substrate)

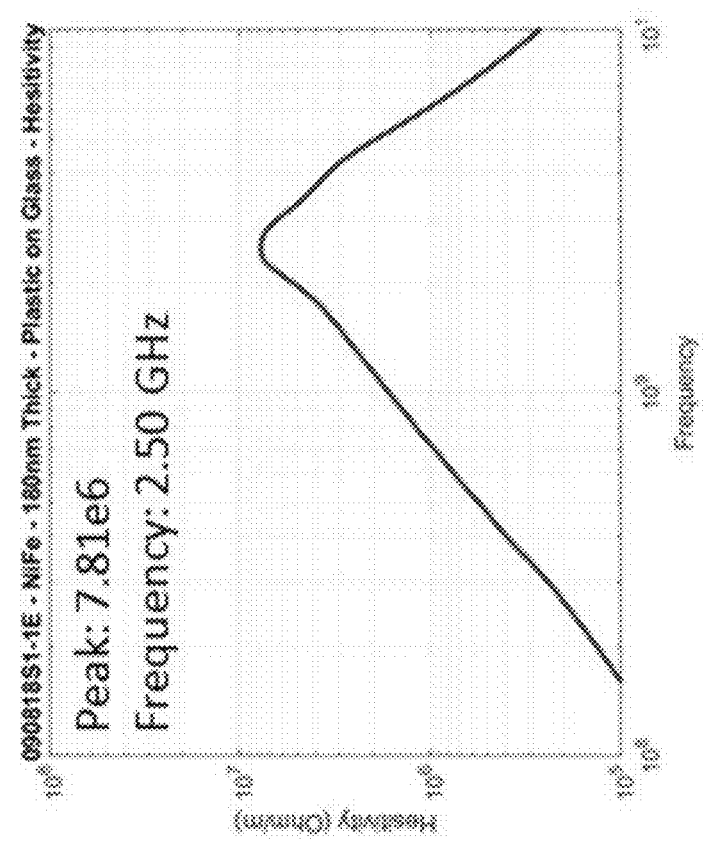
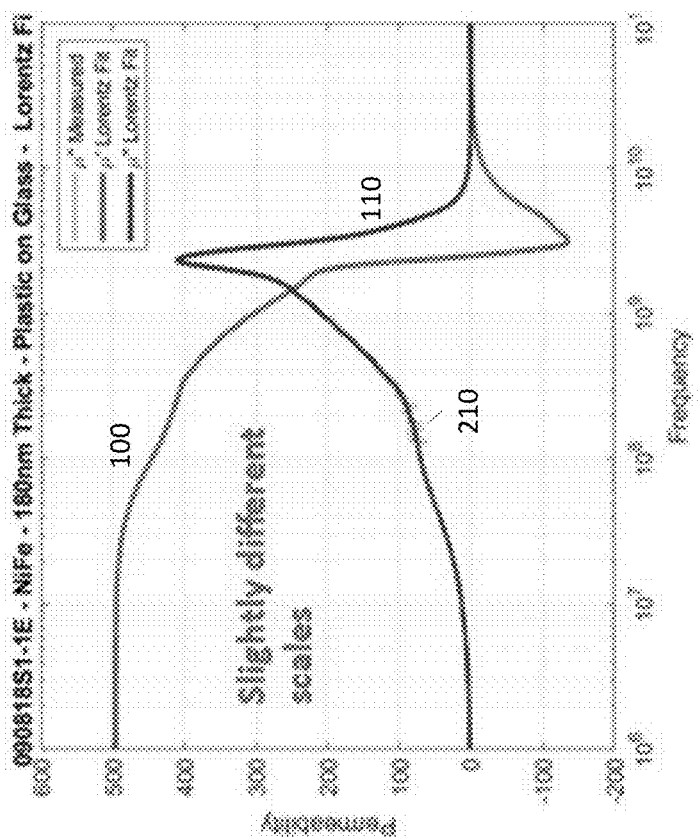
Figure 7

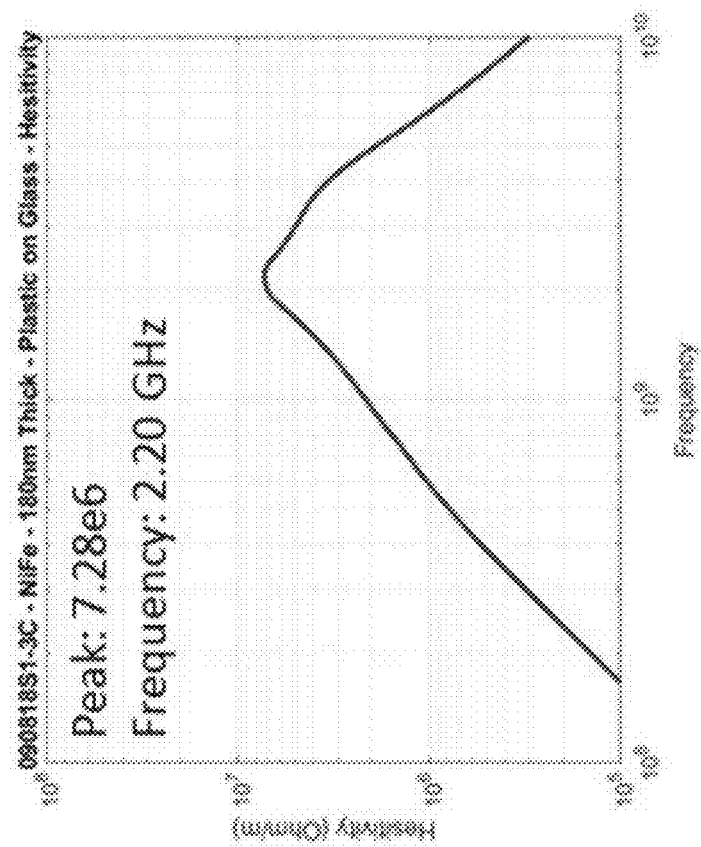
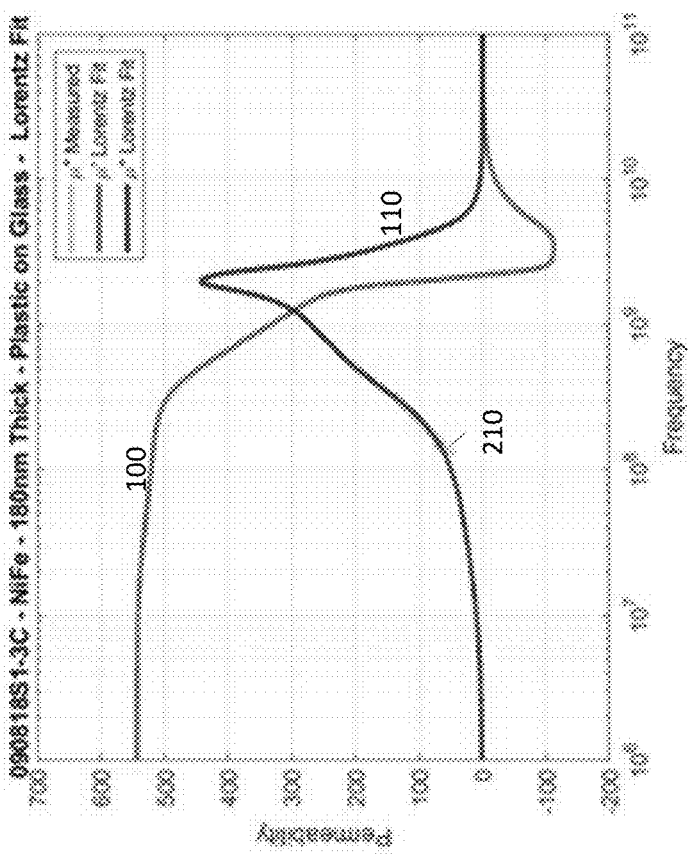
Figure 8

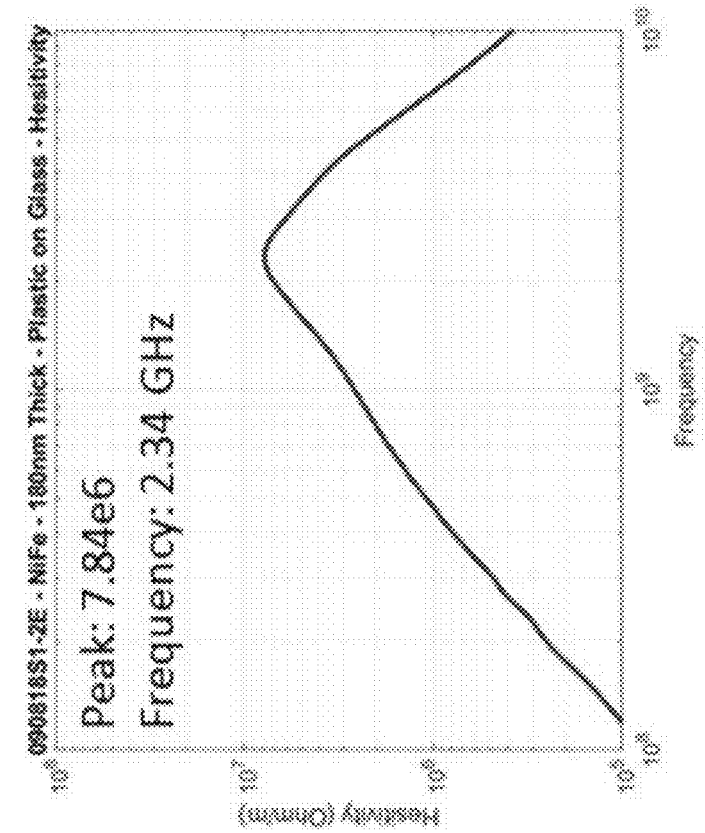
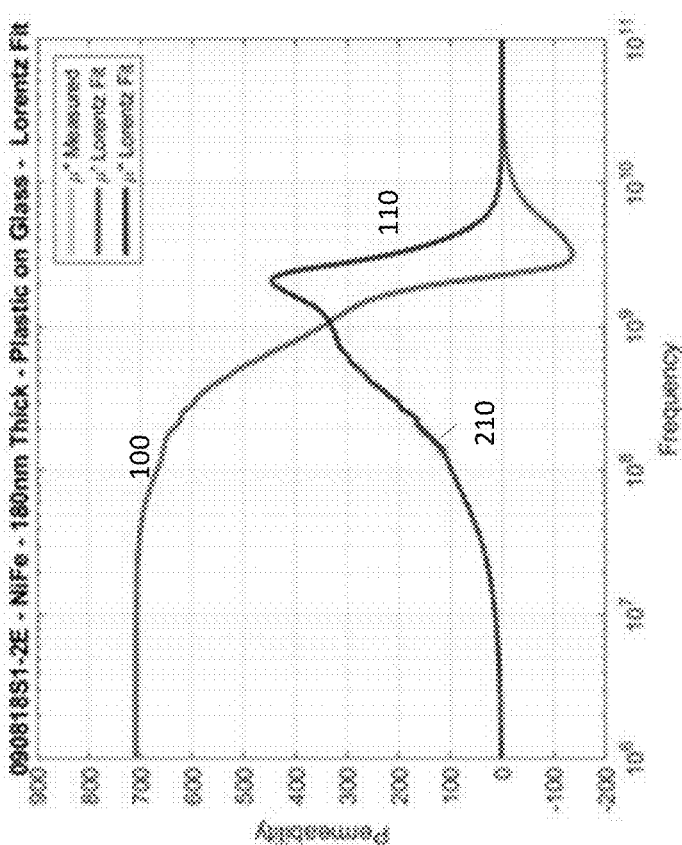
Figure 9

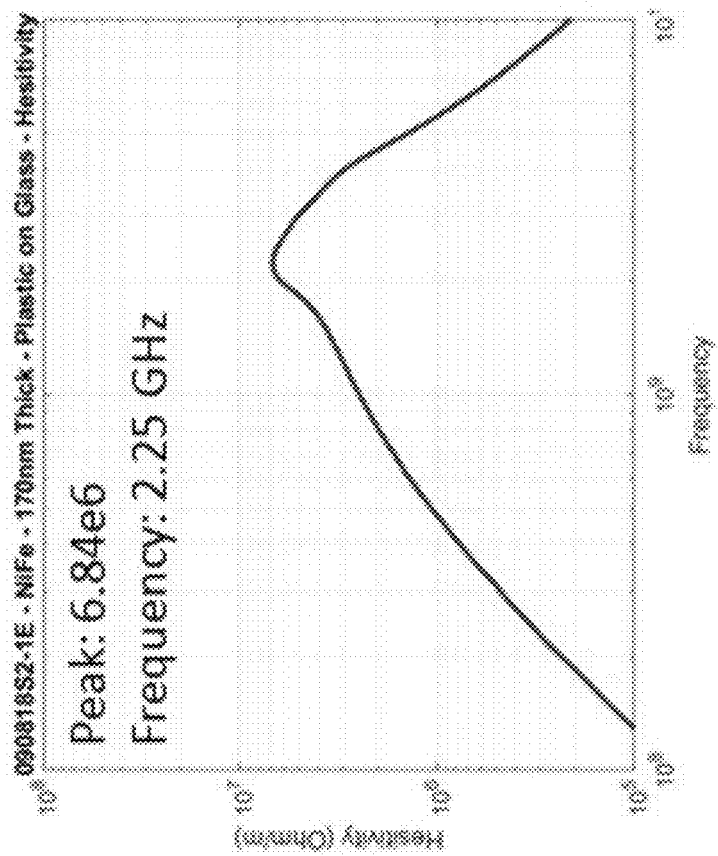
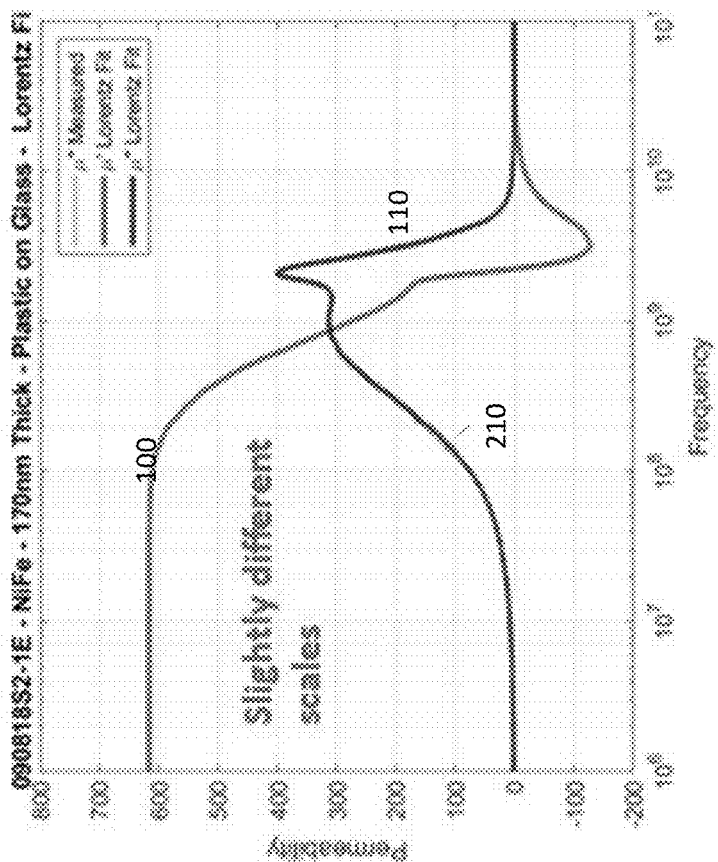
Figure 10

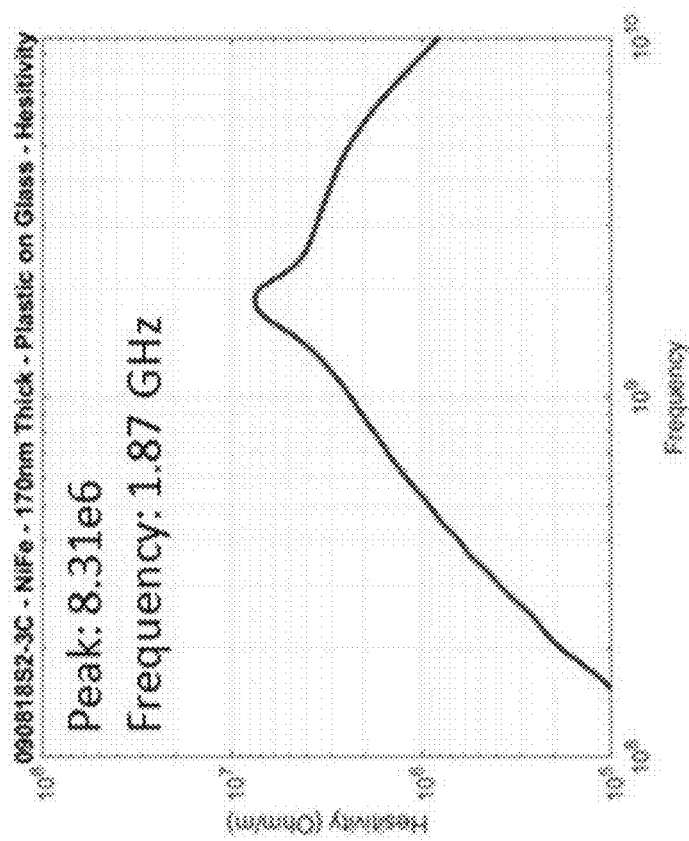
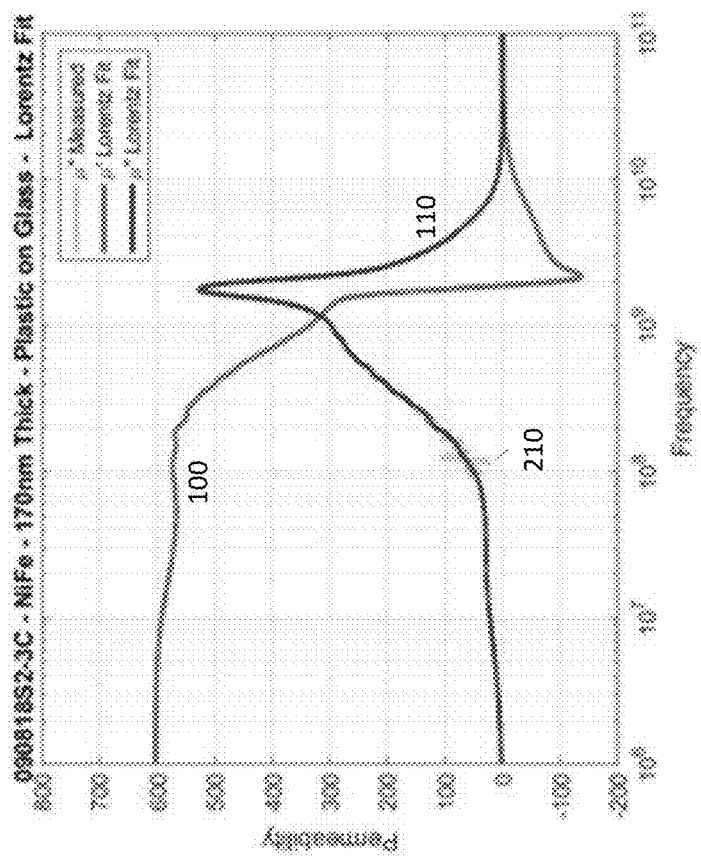
Figure 11

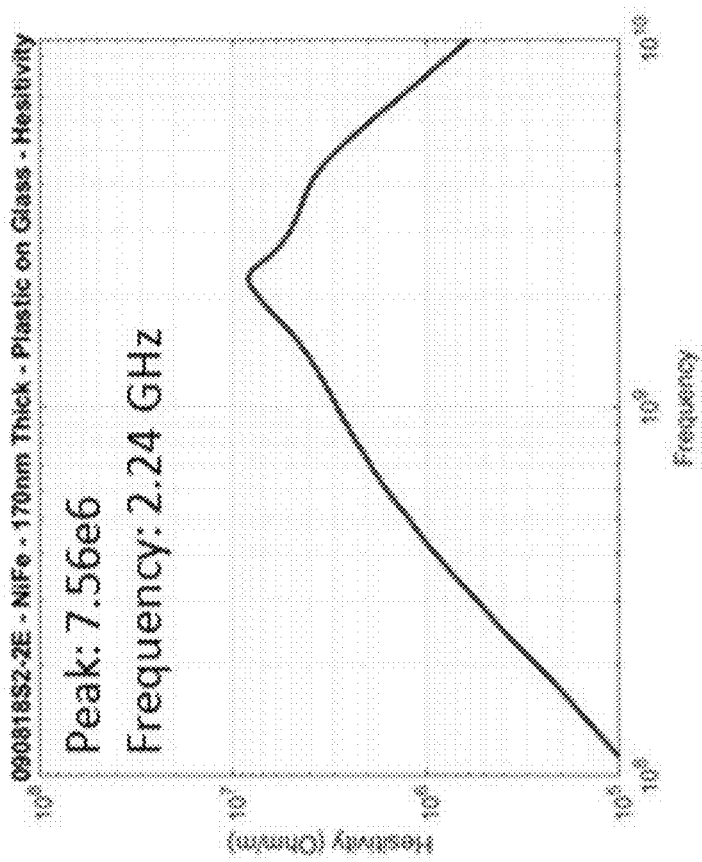
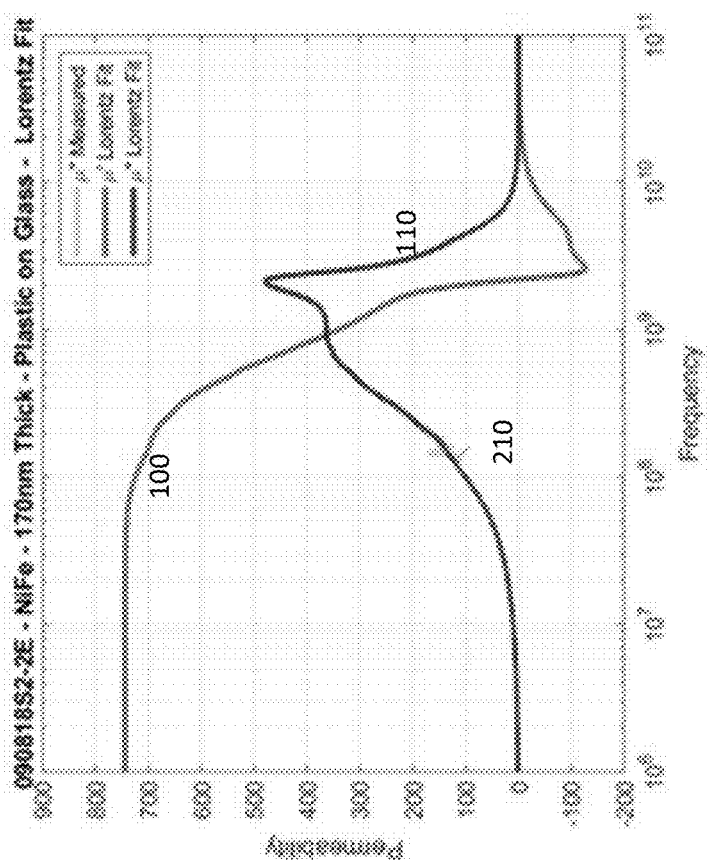
Figure 12

MAGNETIC CONDUCTIVE NIFE ALLOYS

CROSS REFERENCE TO RELATED APPLICATION

The present application claims priority from U.S. Provisional Patent Application No. 62/682,056, filed Jun. 7, 2018, and entitled "ELECTRODEPOSITED NIFE ALLOYS WITH HIGH MAGNETIC CONDUCTIVITY FOR MAGNETIC FLUX CHANNEL ANTENNA APPLICATIONS," the entire disclosure of which is hereby incorporated by reference in its entireties.

GOVERNMENT RIGHTS

Please note that this invention was funded by a government agency.

This invention was made with government support under FA8650-16-C-1730 awarded by the Air Force Research Laboratory. The government has certain rights in the invention.

FIELD

The present disclosure relates to magnetic conductive materials, and in particular to magnetic conductive Nickel Iron (NiFe) alloys with high magnetic conductivity.

BACKGROUND

Magnetic flux channel (MFC) antennas made of thousands of windings of high magnetic conductivity materials have recently been demonstrated as efficient as conventional antennas, but in a much smaller form factor (D. Auckland, C. Daniel and R. Diaz, "A New Type of Conformal Antenna Using Magnetic Flux Channels", presented at the 2014 Military Communications Conference, Baltimore, Md. in October 2014). The state-of-the-art product used to build the MFC antennas is CoZrNb tape in 12 um thick polymer tape, which was produced by high-cost magnetron sputtering under very delicate control over sputtering temperature, sputtering angle, applied magnetic field and other conditions, therefore very expensive.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 3 depicts plots of magnetic permeability and conductivity (hesitivity) versus frequency for an example electrodeposited NiFe alloy thin film on an example substrate, in accordance with various embodiments.

FIG. 5-12 depict plots of magnetic permeability and conductivity (hesitivity) versus frequency for various exemplary NiFe alloy thin film on a glass substrate, in accordance with various embodiments.

SUMMARY OF THE INVENTION

Figure 1B:
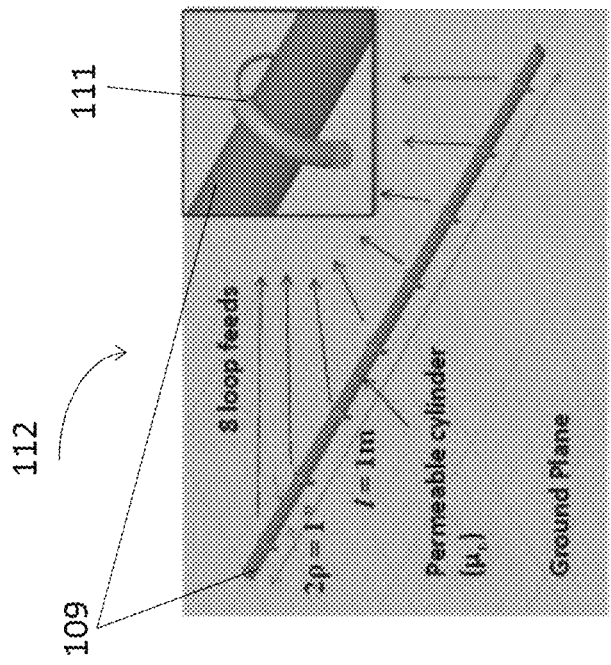
FIGS. 1(a)-1(d) depict example magnetic conductive devices including NiFe alloy, a process for making the magnetic conductive devices, and applications of the magnetic conductive devices, in accordance with various embodiments.

Techniques, devices and methods are described to provide electrodeposited NiFe alloy thin films on substrates.

Embodiments herein may present a magnetic conductive device including a substrate, an under layer above the substrate, and a magnetic conductive layer including NiFe alloy formed on the under layer. The NiFe alloy includes Ni in a range of about 74% to about 84%, and Fe in a range of about 26% to about 16%.

Embodiments herein may present a method for forming a magnetic conductive device. The method includes forming a support stack including an under layer above a substrate, cleaning the support stack, and performing electrodeposition on the under layer by placing the support stack into a plating bath to form NiFe alloy on the under layer. The NiFe alloy includes Ni in a range of about 74% to about 84%, and Fe in a range of about 26% to about 16%.

Embodiments herein may present a magnetic flux channel antenna having a permeable cylinder. The permeable cylinder includes a magnetic conductive device. The magnetic conductive device includes a substrate, an under layer above the substrate, and a magnetic conductive layer including NiFe alloy formed on the under layer. The NiFe alloy includes Ni in a range of 74% to 84%, and Fe in a range of 26% to 16%.

In one aspect, an electroplated magnetic thin film may comprise: an electroplated film of Ni—Fe alloy containing Ni by an amount of between 74-80 wt % and Fe by an amount of 26-20 wt %; and a substrate, wherein the electroplated NiFe film is prepared by electrodeposition of the alloy on the substrate in a plating bath at room temperature. Furthermore, the plating bath may include a nickel source, an iron source, a weak acid, an antioxidant, a reducer, and a wetting agent, and the substrate may include a 20-50 nm Cu under layer. For example, the substrate may be 12 um thick, and May be made of one of polyethylene glycol, polyamide, PET or glass.

In one aspect, the NiFe alloy may be plated onto the substrate under a constant current condition supplied by a DC power supply.

In another aspect, as regards the plating bath, the nickel source of the plating bath may be NiSO4, and the iron source of the plating bath may be FeCl2. Furthermore, the weak acid may be boric acid, the reducer DMAB, and the wetting agent SDS.

In another aspect, reagents for the plating bath may be dissolved in deionized water (DI), and, for each liter of DI, the following reagents may be dissolved:

0.1 M NiSO4;
0.005 M FeCl2;
10 g boric acid;
1 g L-ascorbic acid; 1 g DMAB; and 0.1 g SDS.

Moreover, the plating bath may further include from 0.1-1 g/L of saccharin, and the electroplating may be performed at a current density of 5 mA/cm2 with fast agitation.

In another aspect, the substrate may further include an adhesion layer between the substrate and the Cu under layer, and the adhesion layer may comprise 5 nm of Ti/Cr.

In yet another aspect, a method of preparing a magnetic thin film may include providing a substrate; providing an electroplating bath, comprising: a nickel source, an iron source, a weak acid, an antioxidant, a reducer, and a wetting agent; and using the electroplating bath, electrodepositing a film of Ni—Fe alloy containing Ni by an amount of between 74-80 wt % and Fe by an amount of 26-20 wt % onto the substrate.

Furthermore, the substrate may be one of polyethylene glycol, polyamide, PET or glass, and includes a 20-50 nm Cu under layer.

In yet another aspect, the method may further include controlling the electrodepositing to deposit a NiFe film onto the substrate having a thickness of between 100-500 nm.

In still another aspect, in the method, reagents for the plating bath may be dissolved in deionized water (DI), and, for each liter of DI, the following reagents may be dissolved: 0.1 M NiSO4; 0.005 M FeCl2; 10 g boric acid; 1 g L-ascorbic acid; 1 g DMAB; and 0.1 g SDS.

DETAILED DESCRIPTION

Magnetic flux channel (MFC) antennas made of thousands of windings of high magnetic conductivity materials. MFC antennas may use magnetic conductive material to build magnetically permeable flux channel, which requires highly magnetically permeable and conductive materials. The efficiency of the MFC antennas is primarily determined by the peak magnetic conductivity of the permeable material. Previously, MFC antenna design was demonstrated using a commercialized CoZrNb film on 12 um thick polymer tape, which was produced by high-cost vacuum sputtering technique.

Ni80Fe20, commonly known as permalloy, has a theoretical magnetic conductivity as high as 9 Mohms/m. Thus, permalloy may serve as an excellent candidate material from which to build a MFC antenna. However, permalloy's magnetic permeability has heretofore only been demonstrated on thin films prepared by vacuum techniques. While numerous studies have also been reported regarding electroplated permalloy, they do not demonstrate a high permeability/conductivity in the microwave region.

Embodiments herein may present a magnetic conductive material including NiFe alloy. The NiFe alloy may be made on a under layer of a thickness of about 20-50 nm, where the under layer may be formed on a substrate. The NiFe alloy may be made by electrodeposition, which may substantially reduce the cost. The electrodeposited NiFe alloy may have a peak magnetic conductivity of 6-9 M ohms/m, which outperforms high-cost CoZrNb. The plating bath for electrodeposition may include a nickel source, an iron source, a weak acid, an antioxidant, a reducer, and a wetting agent. The NiFe alloy could be plated under a constant current condition using a common DC power supply at room temperature. In various tests performed, the NiFe alloy presented herein has achieved the theoretical conductivity of permalloy. Thus, permalloy produced according to various embodiments may serve as an excellent replacement for CoZrNb for use in MFC applications.

It is here noted that, using the example processes described herein, in contrast to prior attempts at electroplated NiFe alloys, a NiFe alloy with high magnetic permeability and magnetic conductivity may be produced. Example values obtained for example magnetic thin film NiFe alloys produced according to various embodiments were seen to have a peak imaginary permeability of 1500-2000, and a peak conductivity of 6-9 Mohms/m.

It is noted that the use of a NiFe alloy prepared via electrodeposition, in accordance with may significantly reduce production costs, as well as improve performance. For example, an electrodeposited NiFe alloy prepared in accordance with various embodiments may have a peak magnetic conductivity of 6-9 M ohms/m, which outperforms high-cost CoZrNb alloys. As described more fully below, in embodiments, a plating bath for the electrodeposition may include a nickel source, an iron source, a weak acid, an antioxidant, a reducer, and a wetting agent. In embodiments, the alloy may be deposited on any type of substrate with a Cu under layer, for example, one between 20-30 nm. In embodiments, an example NiFe alloy may, for example, be plated under a constant current condition using, for example, a common DC power supply at room temperature.

As noted above, in accordance with various embodiments, a NiFe alloy may be prepared by electrodeposition at room temperature. In embodiments, a plating bath for the electrodeposition may include 0.1-0.2 M NiSO4, 0.001-0.010 M FeCl2, 10-20 g/L boric acid, 0.5-5 g/L L-ascorbic acid, 0.5-5 g/L Dimethylamine borane (DMAB), 0.01-1 g/L Sodium dodecyl sulfate (SDS) and 0-20 g/L NH4Cl.

In embodiments, the NiFe alloy may be plated, for example, under constant current condition (e.g. 1-5 mA/cm2) with agitation. In embodiments, the NiFe alloy may be deposited onto a substrate. For example, any substrate with a Cu under-layer (>10 nm) may be used for the NiFe alloy plating. In some embodiments, a Cu under-layer may be from 30-40 nm in thickness. In embodiments, the deposited alloy film may be optically smooth, with a film roughness of tens of nanometers.

In embodiments, the composition of the electrodeposited alloy may vary, and may, for example, has between Ni78Fe22 and Ni84Fe16 in the deposits. As regards thickness, in embodiments, an example NiFe film may have a thickness of between 100-500 nm. In some embodiments, it is noted that to obtain high magnetic permeability, the film thickness may preferably be limited to <500 nm, so as to minimize eddy currents.

In embodiments, the pH of an example plating bath may be adjusted to, for example, between 3-4 by the addition of sulfuric acid, and, in embodiments, agitation may be applied during plating. In embodiments, a two-electrode setup and a simple DC power supply may be used for plating. Additionally, for example, a plating current density of 1-5 mA/cm², and a stainless steel plate may be used as a counter electrode to complete the circuit.

In one example, a plating bath for the electrodeposition may be prepared by dissolving 0.1 M NiSO4, 0.005 M FeCl2, 10 g boric acid, 1 g L-ascorbic acid, 1 g DMAB, and 0.1 g SDS in 1 L de-ionized (DI) water. In this example, the plating may be performed at a current density of 5 mA/cm² with fast agitation.

Prior to plating, the substrate may be cleaned, such as, for example, by using 10% sulfuric acid for 30 sec, and then thoroughly flushing the substrate with DI water. To achieve high magnetic permeability/conductivity, a Cu under-layer of the substrate may preferably be limited to a small thickness, for example, between 30-40 nm, or alternatively, <35 nm, to minimize the magnetic field shielding effect.

In accordance with various embodiments, the speed of NiFe plating may be controlled by adjusting the amount of DMAB, current density and agitation speed during plating. For example, using a larger amount of DMAB, a higher current density and a slower agitation may lead to faster film growth. For example, with 5 g/L DMAB, 2 mA/cm2 and no agitation, an example NiFe film was seen to grow at a rate of ~75 nm/min. In embodiments, a NiFe film may have a thickness of between 100-500 nm. As noted above, to achieve high magnetic permeability/conductivity, the film thickness should be limited to 500 nm to minimize the eddy current.

It is here noted that there may generally be residual stress in electrodeposits. In embodiments, this may be reduced by the addition of saccharin, such as, for example, from 0.1-1 g/L. Alternatively, or in addition, for example, FeCl2 in the plating bath may be replaced with FeSO4. However, it is noted, that in experiments run by the inventors, it was found that high residual stress may be necessary to achieve the desired near theoretical magnetic properties of the NiFe alloy.

It is also here noted that if there is large residual stress, thicker deposits may lead to under layer delamination, e.g., the Cu under layer of the substrate may delaminate from underneath the substrate. Therefore, in embodiments, in order to address this issue, a thin adhesion layer of Ti/Cr, for example, on the order of ~5 nm, may be provided to improve the adhesion between an example Cu under layer and an example substrate. Also, it is noted, NiFe deposited on stiffer substrates has shown better magnetic properties than such an alloy deposited on flexible substrates. Thus, in some embodiments, a NiFe alloy "tape" may be preferably plated onto polymer substrates with tension applied.

In some embodiments, L-ascorbic acid may be used to prevent Fe2+ from immediate oxidation in the plating bath. It is noted that L-ascorbic acid may lower the pH of the bath, thus making it more stable. It is also noted that Fe2+ is stable at a pH of approximately 2-3, and at such pH does not immediately oxidize to Fe3+. It is still further noted that 5 g/L of L-ascorbic has been shown to extend the shelf life of the bath to two weeks. In embodiments, the pH of the plating bath may be tuned by varying the amount of L-ascorbic acid.

It is noted that in various experiments run by the inventors, magnetic properties of the deposited alloy have been measured using a custom-designed microstrip permeameter, which has been demonstrated to provide very accurate and reliable thin film permeability measurements. One such discussion may be found in Tom Sebestian, Sergio A. Clavijo, Rodolfo Diaz, *Improved accuracy thin film permeability extraction for a microstrip permeamete*, Journal of Applied Physics 113, 033906 (2013). In the experiments run by the inventors, a peak imaginary permeability of the deposits was found to be as high as 1500-2000, a peak permeability of 1500-2000, and a peak magnetic conductivity (hesitivity) was found to be as high as 6-9 M ohms/m. This is the first time that electroplated NiFe has been shown to have these levels of magnetic permeability/conductivity, as known to the inventors.

FIGS. 1(a)-1(d), 2(a)-2(f), 3, 4(a), 4(b), 5-12 are next described, which illustrate example magnetic thin films electroplated according to various embodiments, and magnetic permeability and conductivity (hesitivity) results for each of these embodiments, in accordance with various embodiments.

FIGS. 1(a)-1(d) depict example magnetic conductive devices including NiFe alloy, a process for making the magnetic conductive devices, and applications of the magnetic conductive devices, in accordance with various embodiments.

Figure 1A:
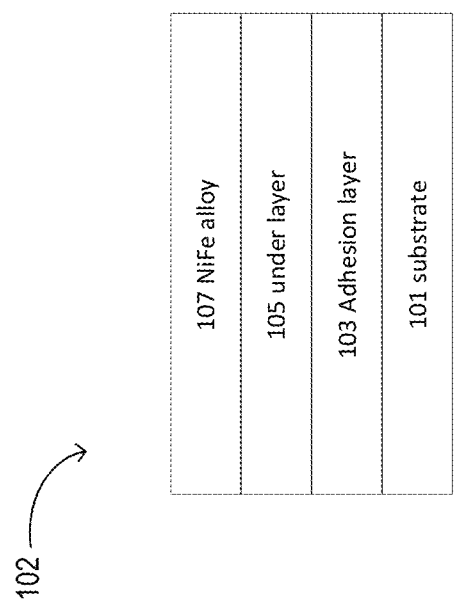

In embodiments, as shown in FIG. 1(a), a magnetic conductive device 102 includes a substrate 101, an under layer 105 above the substrate 101, and a magnetic conductive layer 107 formed on the under layer 105. The magnetic conductive layer 107 includes NiFe alloy, where the NiFe alloy includes Ni in a range of about 74% to about 84%, and Fe in a range of about 26% to about 16%. In some embodiments, the magnetic conductive device 102 may further include an adhesion layer 103 between the substrate 101 and the under layer 105, which may include Ti or Cr, and have a thickness of about 5 nm to about 20 nm.

In embodiments, the under layer 105 has a thickness of about 20 nm to about 50 nm, and includes a material selected from copper, gold, silver, or platinum. The substrate 101 may have a thickness of about 5 um to about 15 um, and includes polyethylene glycol, polyamide, polyethylene terephthalate (PET), or glass. The magnetic conductive layer 107 may have a thickness of about 100 nm to about 500 nm, and the NiFe alloy in the magnetic conductive layer 107 may have a magnetic conductivity of about 6M ohms/m to about 9 M ohms/m.

In embodiments, as shown in FIG. 1(b), a magnetic flux channel antenna 112 may include a permeable cylinder 109 and one or more loop feeds 111. The permeable cylinder 109 may include a magnetic conductive device, which may be similar to the magnetic conductive device 102 shown in FIG. 1(a). For example, the permeable cylinder 109 may include a magnetic conductive device having a substrate, an under layer above the substrate, and a magnetic conductive layer including NiFe alloy formed on the under layer.

In embodiments, the NiFe alloy of the magnetic conductive device formed on the permeable cylinder 109 may include Ni in a range of 74% to 84%, and Fe in a range of 26% to 16%. In embodiments, the under layer includes a material selected from copper, gold, silver, or platinum. The substrate may include polyethylene glycol, polyamide, polyethylene terephthalate (PET), or glass. The magnetic conductive layer has a thickness of about 100 nm to about 500 nm, the under layer has a thickness of about 20 nm to about 50 nm, and the substrate has a thickness of about 5 um to about 15 um. The NiFe alloy has a magnetic conductivity of about 6M ohms/m to about 9 M ohms/m.

Figure 1C:
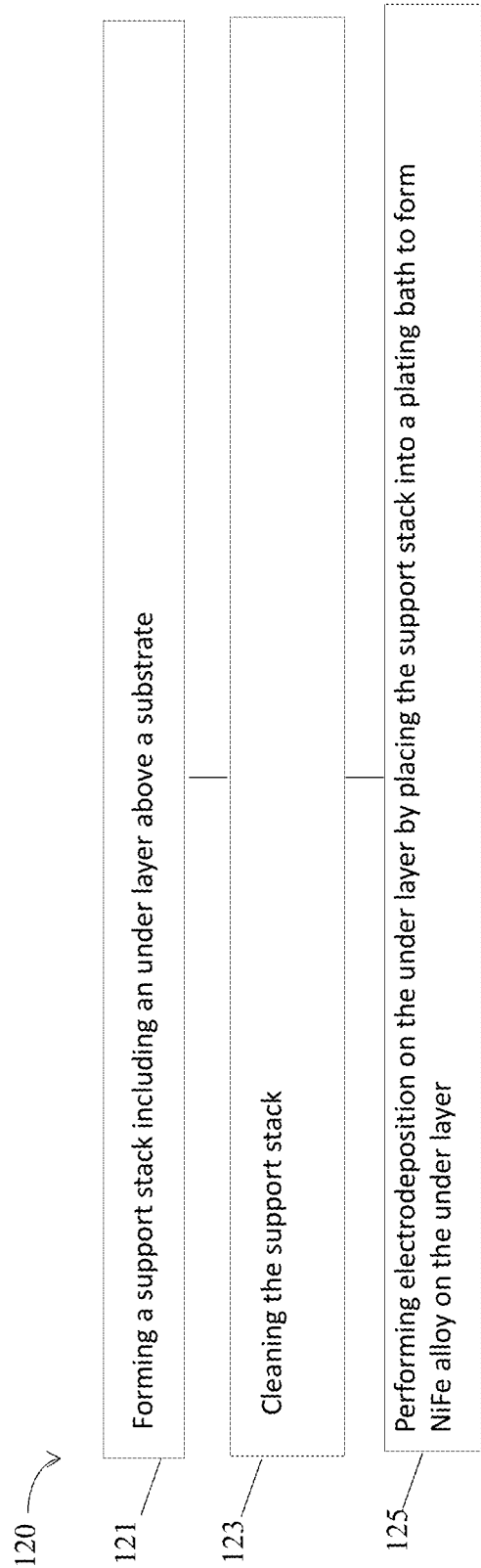

FIG. 1(c) depicts a method 120 for forming a magnetic conductive device. In embodiments, the process 120 may be a process performed to make the magnetic conductive device 102 as shown in FIG. 1(a), or the magnetic conductive device formed on the permeable cylinder 109 as shown in FIG. 1(b).

The process 120 may start at an interaction 121. During the interaction 121, operations may be performed to form a support stack including an under layer above a substrate. In some embodiments, the support stack further includes an adhesion layer between the substrate and the under layer. For example, at the interaction 121, a support stack including the under layer 105 above the substrate 101 may be formed. In some embodiments, the support stack further includes the adhesion layer 103 between the substrate 101 and the under layer 105.

During an interaction 123, operations may be performed to clean the support stack. For example, at the interaction 123, operations may be performed to clean the support stack including the under layer 105 above the substrate 101.

During an interaction 125, operations may be performed to perform electrodeposition on the under layer by placing the support stack into a plating bath to form NiFe alloy on the under layer. The so formed NiFe alloy includes Ni in a range of about 74% to about 84%, and Fe in a range of about 26% to about 16%.

In embodiments, the plating bath used for performing electrodeposition on the under layer may include a nickel source, an iron source, a weak acid, an antioxidant, a reducer, and a wetting agent. For example, the nickel source of the plating bath is NiSO4, the iron source of the plating bath is FeCl2, the weak acid of the plating bath is boric acid, the antioxidant is L-ascorbic acid, the reducer of the plating bath is Dimethylamine borane (DMAB), and the wetting agent of the plating bath is Sodium dodecyl sulfate (SDS). In detail, the plating bath includes 0.1-0.2 M NiSO4, 0.001-0.010 M FeCl2, 10-20 g/L boric acid, 0.5-5 g/L L-ascorbic acid, 0.5-5 g/L DMAB, 0.01-1 g/L SDS, and 0-20 g/L NH4Cl. Reagents for the plating bath may be dissolved in deionized water (DI). For example, for each liter of DI, the following reagents are dissolved: 0.1 M NiSO4; 0.005 M FeCl2; 10 g boric acid; 1 g L-ascorbic acid; 1 g DMAB; and 0.1 g SDS. A pH value of the plating bath may be in a range of about 3 to about 4.

In embodiments, electrodeposition on the under layer may be performed under a constant current density, e.g., with an amount in a range of about 1 mA/cm$^2$ to 5 mA/cm$^2$, supplied by a DC power supply to form the NiFe alloy.

Figure 1D:
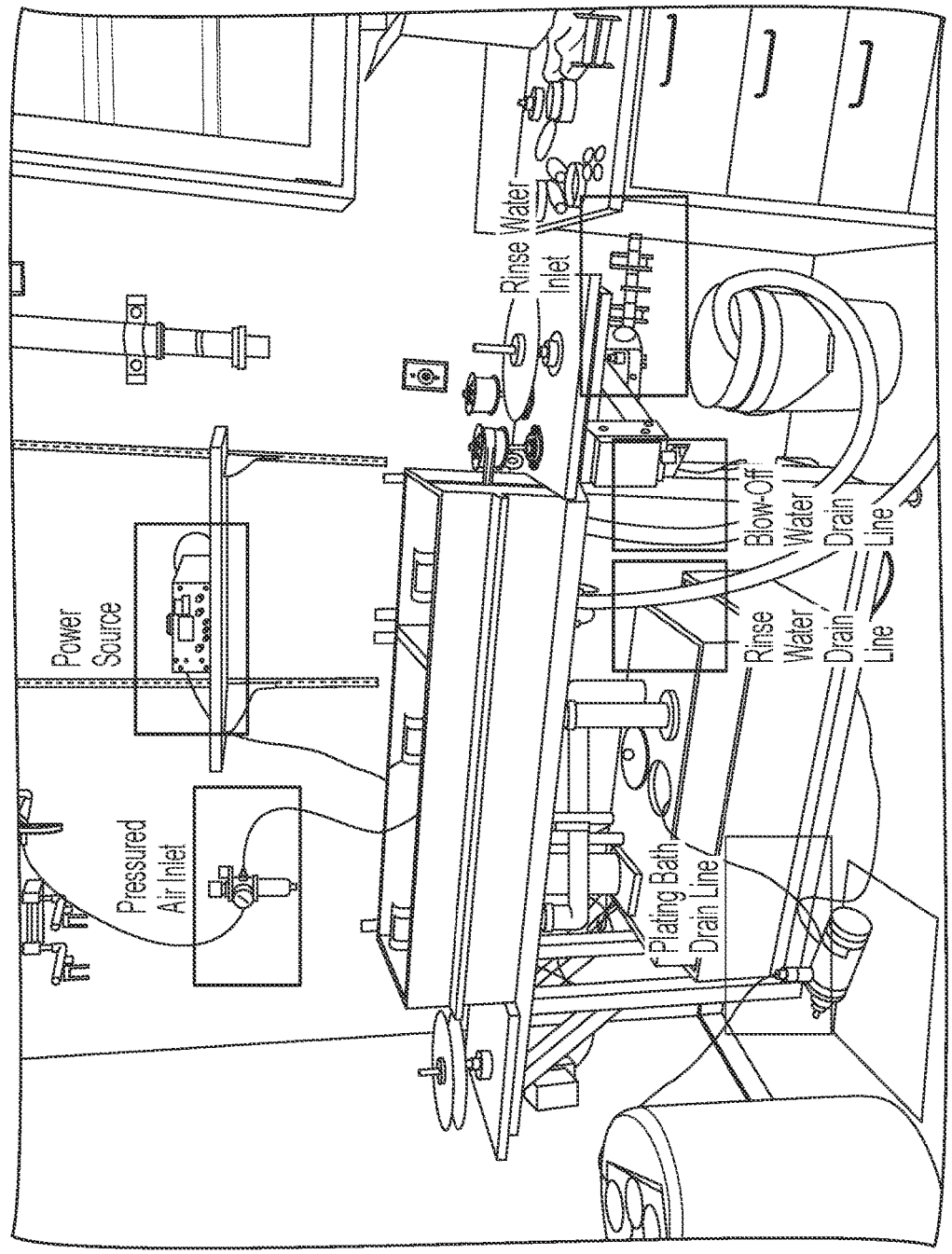

FIG. 1(d) depicts an example facility for roll-to-roll plating setup to perform operations of the process 120 as shown in FIG. 1(c). For example, the facility may include rinse water inlet, rinse water drain line, blow-off water drain line, plating bath drain line, pressured air inlet, and power source to perform operations of the process 120.

FIGS. 2(a)-2(f) depict various photos, and scanning electron microscopy images of a NiFe alloy thin film on an example substrate, in accordance with various embodiments.

Figure 2A:
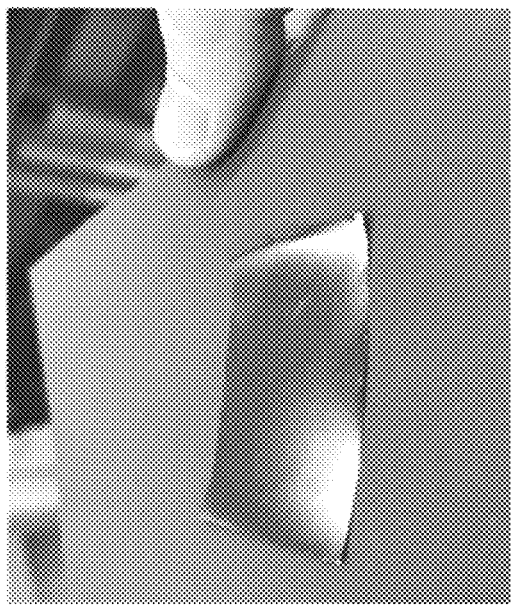
FIGS. 2(a)-2(f) depict various photos, and scanning electron microscopy images of a NiFe alloy thin film on an example substrate, in accordance with various embodiments.

With reference to FIG. 2(a), an photograph of an example electrodeposited NiFe alloy thin film, made according to an embodiment of the present disclosure, is shown. The NiFe alloy was deposited on a 12 um polyethylene glycol substrate, which substrate had a 20 nm Cu under layer.

Figure 2C:
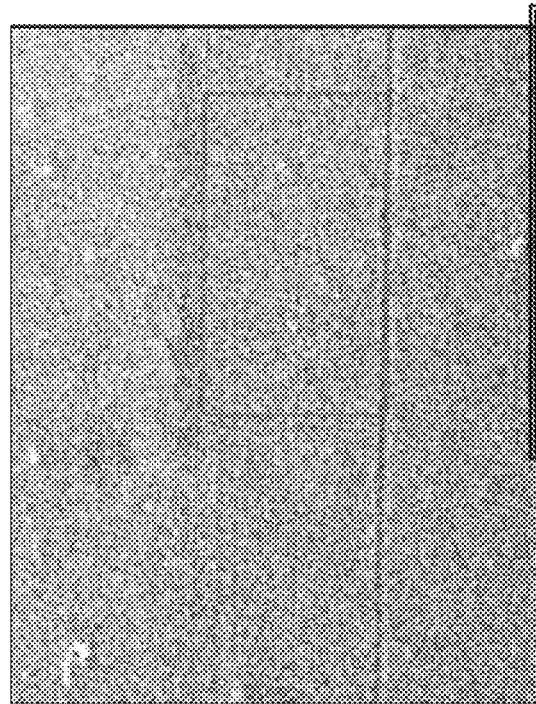
Figure 2B:
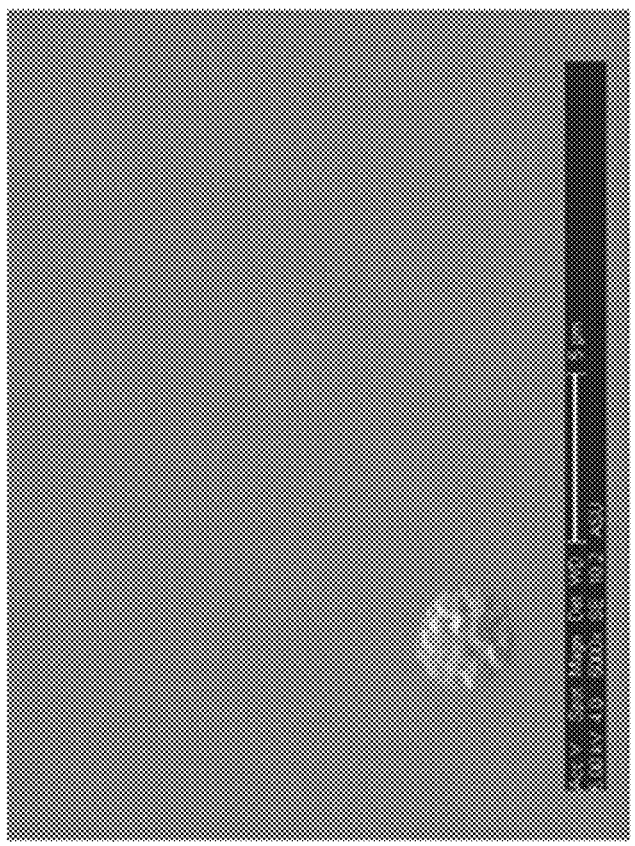

FIG. 2(b) is a scanning electron microscopy image of the example NiFe alloy thin film shown in FIG. 2(a). Continuing with reference to FIG. 2(b), the imperfection is included, as shown, as contrast to the smooth surface of the remainder of the example film.

Figure 2F:
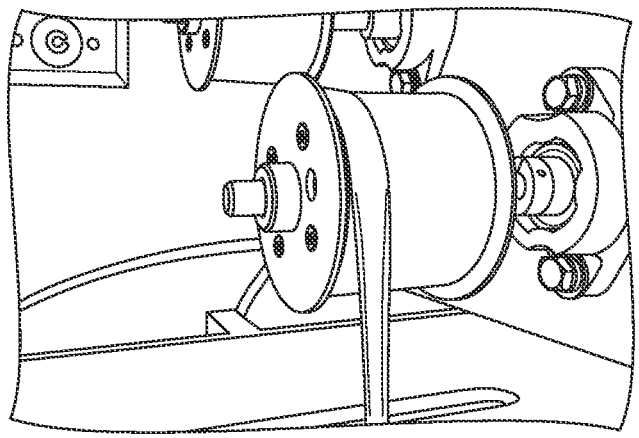
Figure 2E:
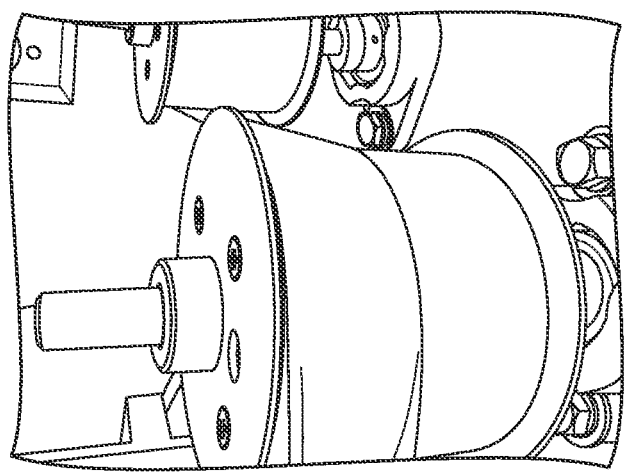
Figure 2D:
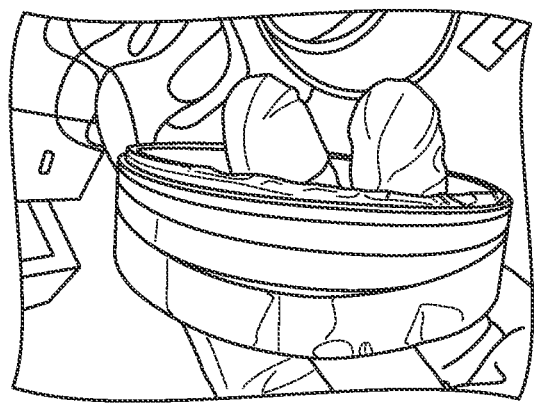

FIG. 2(c) shows a NiFe alloy thin film with composition Ni74-84Fe26-16 (Wt %). FIGS. 2(d)-2(f) show a NiFe alloy thin film made on a PET substrate of 12 um thickness, a Cr adhesion layer of 5 nm thickness, and a Cu under layer of 30 nm thickness, which are made in a roll.

FIG. 3, next described, presents measurements of magnetic permeability (both real and imaginary components) and conductivity, as well as predictions of magnetic permeability (both real and imaginary components) made using a Lorentzian Fit, and hesitivity for an example NiFe alloy thin film on a glass substrate with a 35 nm Cu under layer, provided according to an embodiment. Continuing with reference to FIG. 3, the left panel presents four plots of magnetic permeability versus frequency, these are next described.

As an aid to understanding the plots presented in each of FIGS. 3, 4(a), 4(b), 5-12, it is noted that in the left panel of each figure the magnetic permeability is presented. In each left panel, plot 200 presents the measured real permeability, and plot 210 presents the measured imaginary permeability, of the example electroplated magnetic thin film on the relevant substrate (in the case of FIGS. 3 and 5-12, a glass substrate, and in the case of FIGS. 4(a) and 4(b), a flexible polymer substrate). Moreover, plot 100 presents predicted real permeability, and plot 110 presents predicted imaginary permeability. The predictions shown in plots 100 and 110 in each example were made using a Lorentzian Fit applied to actual measured data. As generally described above, the key quantity in each of the magnetic permeability plots of FIGS. 3-12 is the imaginary component of the magnetic permeability. In the right panel of each plot is presented the hesitivity. As may be seen in the right panel plots, The hesitivity, in each such plot, has a peak of at least 6 M ohm/mn embodiments, which, for use in a MFC antenna, is desired.

With reference to FIG. 3, the peak of the imaginary component of the magnetic permeability may be seen in plot 110 (left panel) as having a maximum value of 1500 at a frequency of about 500 MHz. The peak hesitivity, shown in the right panel of FIG. 3, is shown to be between 6-9 M Ohm/m, at frequencies in the range of 500-600 MHz.

Figure 4A:
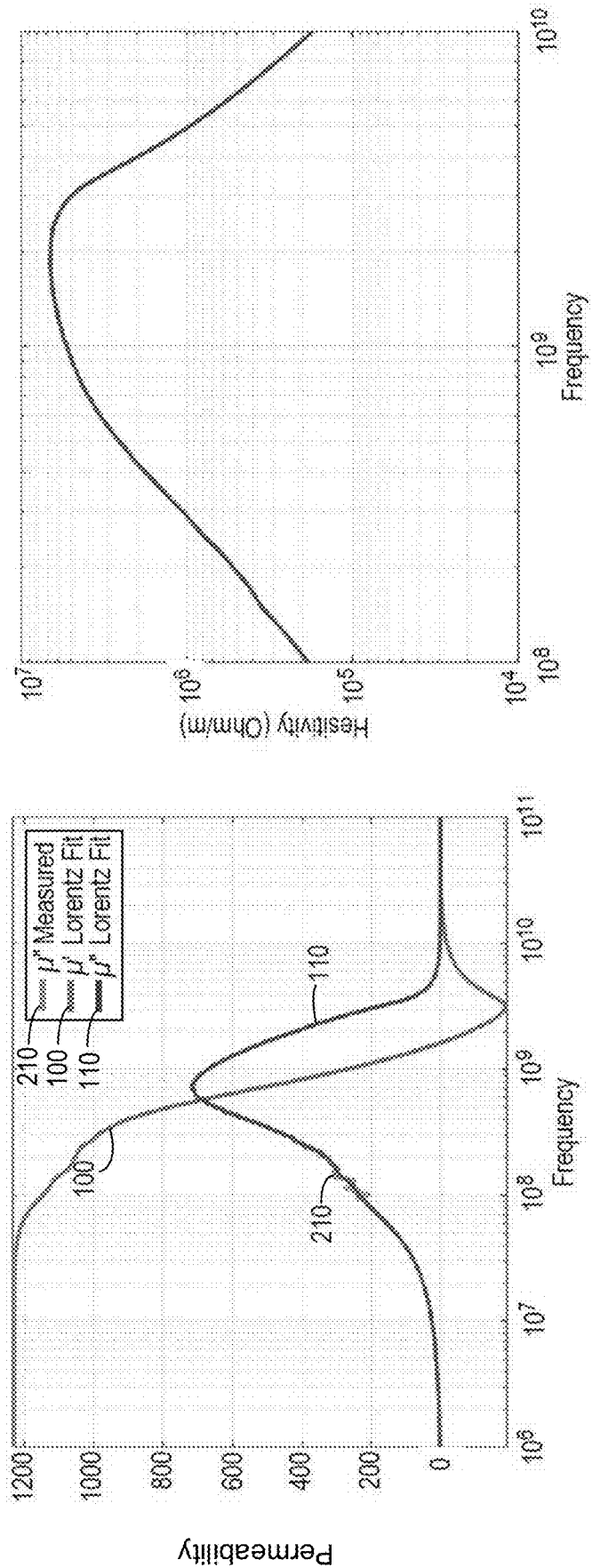
FIG. 4(a) depicts plots of magnetic permeability and conductivity (hesitivity) versus frequency for a first example electrodeposited NiFe alloy thin film on a (flexible) polymer, in accordance with various embodiments.
Figure 4B:
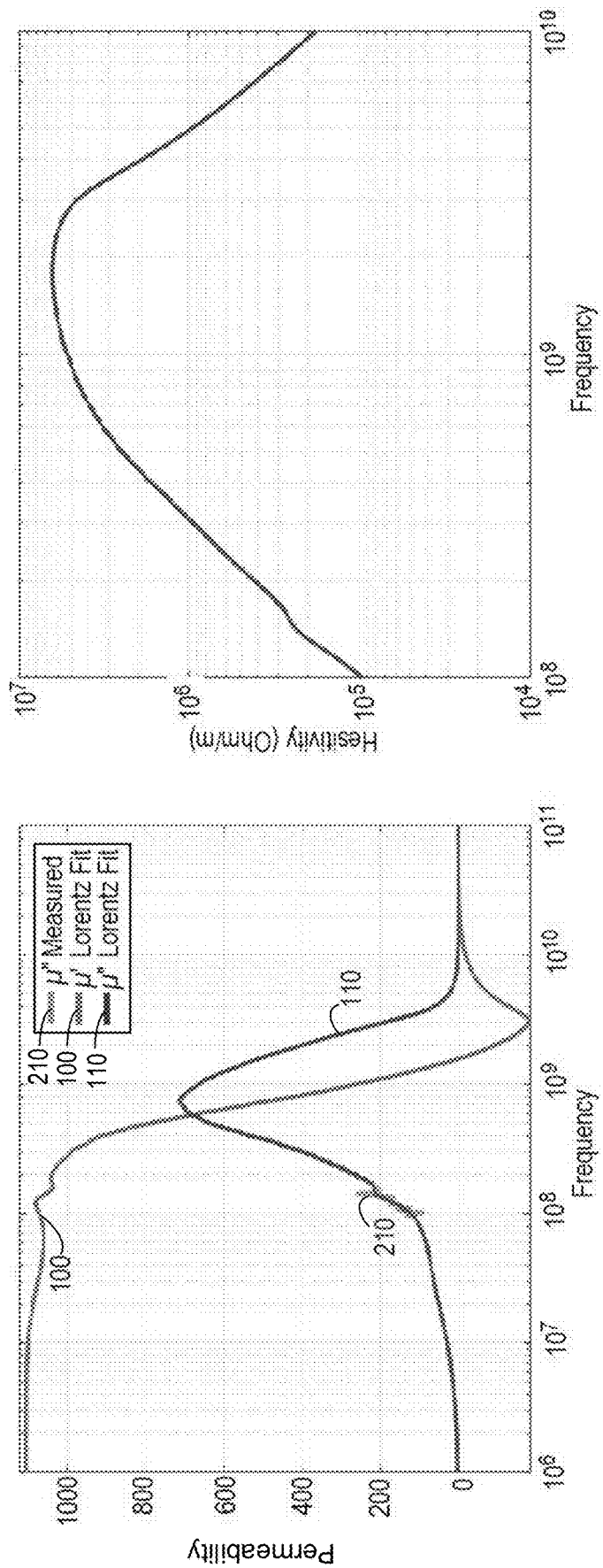
FIG. 4(b) depicts plots of magnetic permeability and conductivity (hesitivity) versus frequency for a second example electrodeposited NiFe alloy thin film on a (flexible) polymer, in accordance with various embodiments.

Similarly, FIGS. 4(a) and 4(b), next described, present measurements of magnetic permeability (imaginary components), as well as predictions of magnetic permeability (both real and imaginary components) made using a Lorentzian Fit, and hesitivity, for two example NiFe thin film alloys deposited on polymer substrates, in accordance with various embodiments. In these two examples the substrates used were Polyethylene terephthalate (PET), of approximate thickness of 12 um, with a 30 nm Cu under layer. It is here noted that for use in a MFC antenna, a flexible substrate is desired. Thus the examples of FIGS. 4(a) and 4(b), which have the flexible substrates, may be preferred, and the examples which utilized a glass substrate, being more rigid, were used to refine the overall electrodeposition process. Accordingly, in each of FIGS. 4(a) and 4(b), a peak imaginary component of magnetic permeability of about 700 was seen, as well as a peak hesitivity of at least 6 M, as shown.

In embodiments, other flexible polymer substrates may also be used for MFC antenna applications, such as, for example, polyamide, or polyethylene glycol (PEG).

Figure 5:
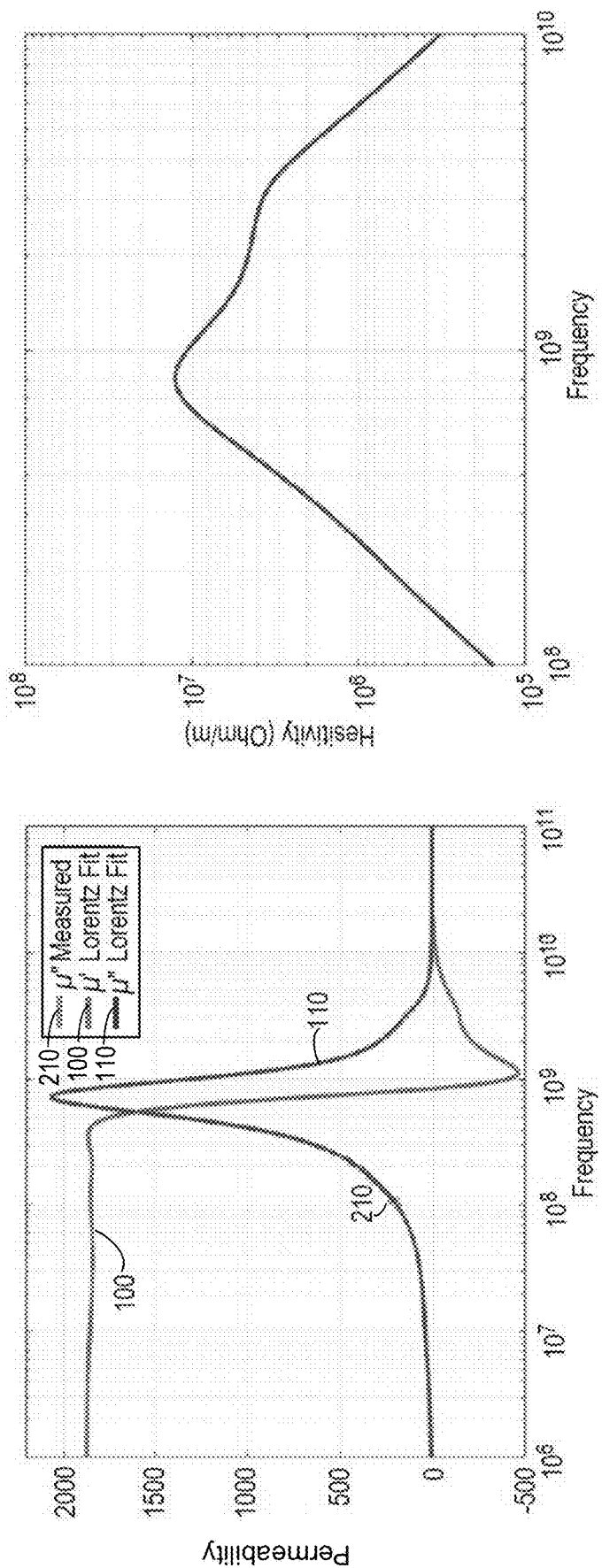

Continuing with reference to FIG. 5, measurements of magnetic permeability (imaginary component), predictions of magnetic permeability (both real and imaginary components) made using a Lorentzian Fit, and hesitivity for a second example NiFe alloy thin film are presented. The example alloy thin film was electrodeposited on a thin film glass substrate, with a Cu under layer, and the alloy has a thickness of between 200-300 nm, and a Ni to Fe ratio tending towards 80:20. As shown in the left panel, the imaginary permeability 110 for this second example reached a peak value of 2000 at about 600 MHz, and, as shown in the right panel, a hesitivity of 10M at about 900 MHz, as shown. As noted above, this is the first time that electroplated NiFe has been shown to have these levels of magnetic permeability/conductivity, within the knowledge of the inventors.

It is noted that in each of the plots of permeability of FIGS. 3-12, where the imaginary component of permeability reaches its peak is precisely where the real component of the permeability, shown at plot 100 in each of FIGS. 3 and 5-12, drops significantly to below zero.

Figure 6:
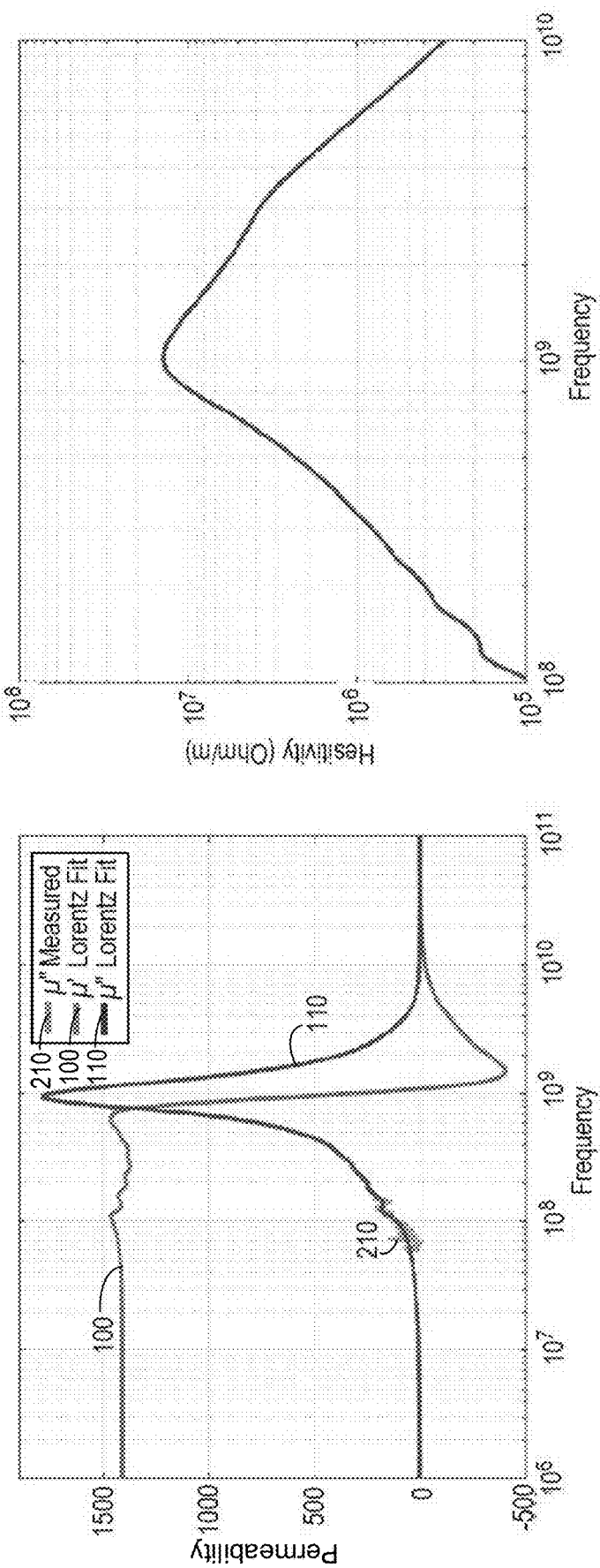

Continuing with reference to FIG. 6, measurements of magnetic permeability (imaginary component), predictions of magnetic permeability (both real and imaginary components) made using a Lorentzian Fit, and hesitivity for a third example NiFe alloy thin film are presented. As in the case of the example of FIG. 5, this example alloy thin film was electrodeposited on a thin film glass substrate, with a Cu under layer, and the alloy has a thickness of between 200-300 nm. As shown in the left panel, the imaginary permeability 110 for this third example reached a peak value of about 1850 at about 1 GHz, and, as shown in the right panel, a hesitivity of about 11M at about 1 GHz, as shown.

FIGS. 7 to 12 below show measurements of permeativity and magnetic conductivity results measured on 6 samples cut from a same roll of electrodeposited NiFe alloy thin film, showing the magnetic properties in scaled-up alloy rolls. All six samples exhibit magnetic conductivity >6 e6 ohms/m.

As shown in FIG. 7, measurements of magnetic permeability (imaginary component), predictions of magnetic permeability (both real and imaginary components) made using a Lorentzian Fit, and hesitivity for a NiFe alloy thin film are presented. The example alloy thin film was electrodeposited on a thin film glass substrate, with a Cu under layer, and the alloy has a thickness of 180 nm, and a Ni to Fe ratio tending towards 80:20. As shown in the left panel, the imaginary permeability 110 for this example reached a peak value of 400 at about 2.5 GHz, and, as shown in the right panel, a hesitivity of 7.81M at about 2.5 GHz, as shown.

As shown in FIG. 8, measurements of magnetic permeability (imaginary component), predictions of magnetic permeability (both real and imaginary components) made using a Lorentzian Fit, and hesitivity for a NiFe alloy thin film are presented. The example alloy thin film was electrodeposited on a thin film glass substrate, with a Cu under layer, and the alloy has a thickness of 180 nm, and a Ni to Fe ratio tending towards 80:20. As shown in the left panel, the imaginary permeability 110 for this example reached a peak value of 450 at about 2.2 GHz, and, as shown in the right panel, a hesitivity of 7.28M at about 2.2 GHz, as shown.

As shown in FIG. 9, measurements of magnetic permeability (imaginary component), predictions of magnetic permeability (both real and imaginary components) made using a Lorentzian Fit, and hesitivity for a NiFe alloy thin film are presented. The example alloy thin film was electrodeposited on a thin film glass substrate, with a Cu under layer, and the alloy has a thickness of 180 nm, and a Ni to Fe ratio tending towards 80:20. As shown in the left panel, the imaginary permeability 110 for this example reached a peak value of 450 at about 2.34 GHz, and, as shown in the right panel, a hesitivity of 7.84M at about 2.34 GHz, as shown.

As shown in FIG. 10, measurements of magnetic permeability (imaginary component), predictions of magnetic permeability (both real and imaginary components) made using a Lorentzian Fit, and hesitivity for a NiFe alloy thin film are presented. The example alloy thin film was electrodeposited on a thin film glass substrate, with a Cu under layer, and the alloy has a thickness of 170 nm, and a Ni to Fe ratio tending towards 80:20. As shown in the left panel, the imaginary permeability 110 for this example reached a peak value of 400 at about 2.25 GHz, and, as shown in the right panel, a hesitivity of 6.84M at about 2.34 GHz, as shown.

As shown in FIG. 11, measurements of magnetic permeability (imaginary component), predictions of magnetic permeability (both real and imaginary components) made using a Lorentzian Fit, and hesitivity for a NiFe alloy thin film are presented. The example alloy thin film was electrodeposited on a thin film glass substrate, with a Cu under layer, and the alloy has a thickness of 170 nm, and a Ni to Fe ratio tending towards 80:20. As shown in the left panel, the imaginary permeability 110 for this example reached a peak value of 510 at about 1.87 GHz, and, as shown in the right panel, a hesitivity of 8.31M at about 1.87 GHz, as shown.

As shown in FIG. 12, measurements of magnetic permeability (imaginary component), predictions of magnetic permeability (both real and imaginary components) made using a Lorentzian Fit, and hesitivity for a NiFe alloy thin film are presented. The example alloy thin film was electrodeposited on a thin film glass substrate, with a Cu under layer, and the alloy has a thickness of 170 nm, and a Ni to Fe ratio tending towards 80:20. As shown in the left panel, the imaginary permeability 110 for this example reached a peak value of 490 at about 2.24 GHz, and, as shown in the right panel, a hesitivity of 7.56M at about 2.24 GHz, as shown.

As noted above, this is the first time that electroplated NiFe has been shown to have these levels of magnetic permeability/conductivity, within the knowledge of the inventors. As may be appreciated from comparisons of FIGS. 5-12, the frequency at which the peak value of imaginary permeability and hesitivity occurs may vary with different actual thin film alloys.

While this document contains many specifics, these should not be construed as limitations on the scope of an invention or of what may be claimed, but rather as descriptions of features specific to particular embodiments of the invention. Certain features that are described in this document in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

Thus, particular embodiments have been described. Variations and enhancements of the described embodiments and other embodiments can be made based on what is described and illustrated.

What is claimed is:

1. A magnetic conductive device, comprising:
    a substrate;
    an under layer above the substrate; and
    a magnetic conductive layer including NiFe alloy formed on the under layer, wherein the NiFe alloy includes Ni in a range of 74 wt. % to 84 wt. %, and Fe in a range of 26 wt. % to 16 wt. %, and where the NiFe alloy has a magnetic conductivity of 6M ohms/m to 9 M ohms/m and a peak magnetic permeability of 1500-2000.

2. The magnetic conductive device of claim 1, wherein the under layer includes a material selected from copper, gold, silver, or platinum.

3. The magnetic conductive device of claim 1, wherein the under layer has a thickness of 20 nm to 50 nm.

4. The magnetic conductive device of claim 1, wherein the substrate has a thickness of 5 um to 15 um.

5. The magnetic conductive device of claim 1, wherein the substrate includes polyethylene glycol, polyamide, polyethylene terephthalate (PET), or glass.

6. The magnetic conductive device of claim 1, wherein the magnetic conductive layer has a thickness of 200 nm to 500 nm.

7. The magnetic conductive device of claim 1, further comprising:
    an adhesion layer between the substrate and the under layer.

8. The magnetic conductive device of claim 7, wherein the adhesion layer includes Ti or Cr, and has a thickness of 5 nm to 20 nm.

9. A method for forming a magnetic conductive device, comprising:
    forming a support stack including an under layer above a substrate;

cleaning the support stack;

performing electrodeposition on the under layer by placing the support stack into a plating bath to form NiFe alloy on the under layer, wherein the NiFe alloy includes Ni in a range of 74% to 84%, and Fe in a range of 26% to 16%; and wherein the NiFe alloy has a magnetic conductivity of 6 M ohms/m to 9 M ohms/m and a peak magnetic permeability of 1500-2000.

10. The method of claim 9, wherein the plating bath includes a nickel source, an iron source, a weak acid, an antioxidant, a reducer, and a wetting agent.

11. The method of claim 10, wherein the nickel source of the plating bath is NiSO4, the iron source of the plating bath is FeCl2, the weak acid of the plating bath is boric acid, the antioxidant is L-ascorbic acid, the reducer of the plating bath is Dimethylamine borane (DMAB), and the wetting agent of the plating bath is Sodium dodecyl sulfate (SDS).

12. The method of claim 9, wherein the plating bath includes 0.1-0.2 M NiSO4, 0.001-0.010 M FeCl2, 10-20 g/L boric acid, 0.5-5 g/L L-ascorbic acid, 0.5-5 g/L DMAB, 0.01-1 g/L SDS, and 0-20 g/L NH4Cl.

13. The method of claim 9, wherein reagents for the plating bath are dissolved in deionized water (DI), and wherein, for each liter of DI, the following reagents are dissolved:

0.1 M NiSO4;
0.005 M FeCl2;
10 g boric acid;
1 g L-ascorbic acid;
1 g DMAB; and
0.1 g SDS.

14. The method of claim 9, wherein a pH value of the plating bath is in a range of 3 to 4.

15. The method of claim 9, wherein the performing electrodeposition on the under layer to form the NiFe alloy includes performing electrodeposition under a constant current density supplied by a DC power supply.

16. The method of claim 15, wherein the performing electrodeposition on the under layer includes performing electrodeposition under constant current density with an amount in a range of 1 mA/cm2 to 5 mA/cm2.

17. The method of claim 9, wherein the support stack further includes an adhesion layer between the substrate and the under layer.

18. A magnetic flux channel antenna, comprising:
a permeable cylinder including a magnetic conductive device, wherein the magnetic conductive device includes
a substrate;
an under layer above the substrate; and
a magnetic conductive layer including NiFe alloy formed on the under layer, wherein the NiFe alloy includes Ni in a range of 74 wt. % to 84 wt. %, and Fe in a range of 26 wt. % to 16 wt. %, and where the NiFe alloy has a magnetic conductivity of 6M ohms/m to 9 M ohms/m and a peak magnetic permeability of 1500-2000.

19. The magnetic flux channel antenna of claim 18, wherein:
the under layer includes a material selected from copper, gold, silver, or platinum;
the substrate includes polyethylene glycol, polyamide, polyethylene terephthalate (PET), or glass;
the magnetic conductive layer has a thickness of 200 to 500 nm;
the under layer has a thickness of 20 nm to 50 nm; and
the substrate has a thickness of 5 um to 15 um.

* * * * *